United States Patent

Umemura et al.

[11] Patent Number: 5,960,542
[45] Date of Patent: Oct. 5, 1999

[54] METHOD OF PRODUCING PISTON FOR SWASH PLATE COMPRESSOR

[75] Inventors: Yukio Umemura, Lille, France; Toshikatsu Miyaji, Tochigi, Japan

[73] Assignee: Calsonic Corporation, Tokyo, Japan

[21] Appl. No.: 08/925,047

[22] Filed: Sep. 8, 1997

[51] Int. Cl.$^6$ .................................................. B23P 15/00
[52] U.S. Cl. ........................ 29/888.042; 29/888.04; 29/888.048
[58] Field of Search ........................ 29/888.042, 888.048, 29/527.3, 527.4, 527.6, 888.04

[56] References Cited

U.S. PATENT DOCUMENTS

| | | | |
|---|---|---|---|
| 2,361,046 | 10/1944 | Molly | 148/12 |
| 3,396,447 | 8/1968 | Christiansen | 29/527.3 |
| 4,505,016 | 3/1985 | Roberts | 29/527.3 |
| 4,519,119 | 5/1985 | Nakayama et al. | 29/156.5 |
| 4,997,024 | 3/1991 | Cole et al. | 29/527.3 |

FOREIGN PATENT DOCUMENTS

| | | |
|---|---|---|
| 0 780 572 A2 | 6/1997 | European Pat. Off. |
| 974 022 | 8/1960 | Germany |
| 403009083 | 1/1991 | Japan ................................. 29/888.04 |
| 9-256952 | 9/1997 | Japan |

*Primary Examiner*—Irene Cuda
*Attorney, Agent, or Firm*—Foley & Lardner

[57] ABSTRACT

In order to produce a single headed piston for a swash plate compressor, the following steps are used. First, a shaped block of metal is cast, the block including a plurality of unfinished piston structures which are aligned and integrated, each unfinished piston structure including a head portion and a neck portion which are axially spaced. Then, the head portions of the piston structures are machined. Then, an outer surface of the cast block is entirely coated with a fluorocarbon resin. Then, the coated outer surfaces of the head portions are ground, and then, each neck portion is machined to form two spherical recesses which face each other, the two spherical recesses being used for slidably receiving shoes. Then, the cast block is cut to separate the piston structures from one another.

17 Claims, 5 Drawing Sheets

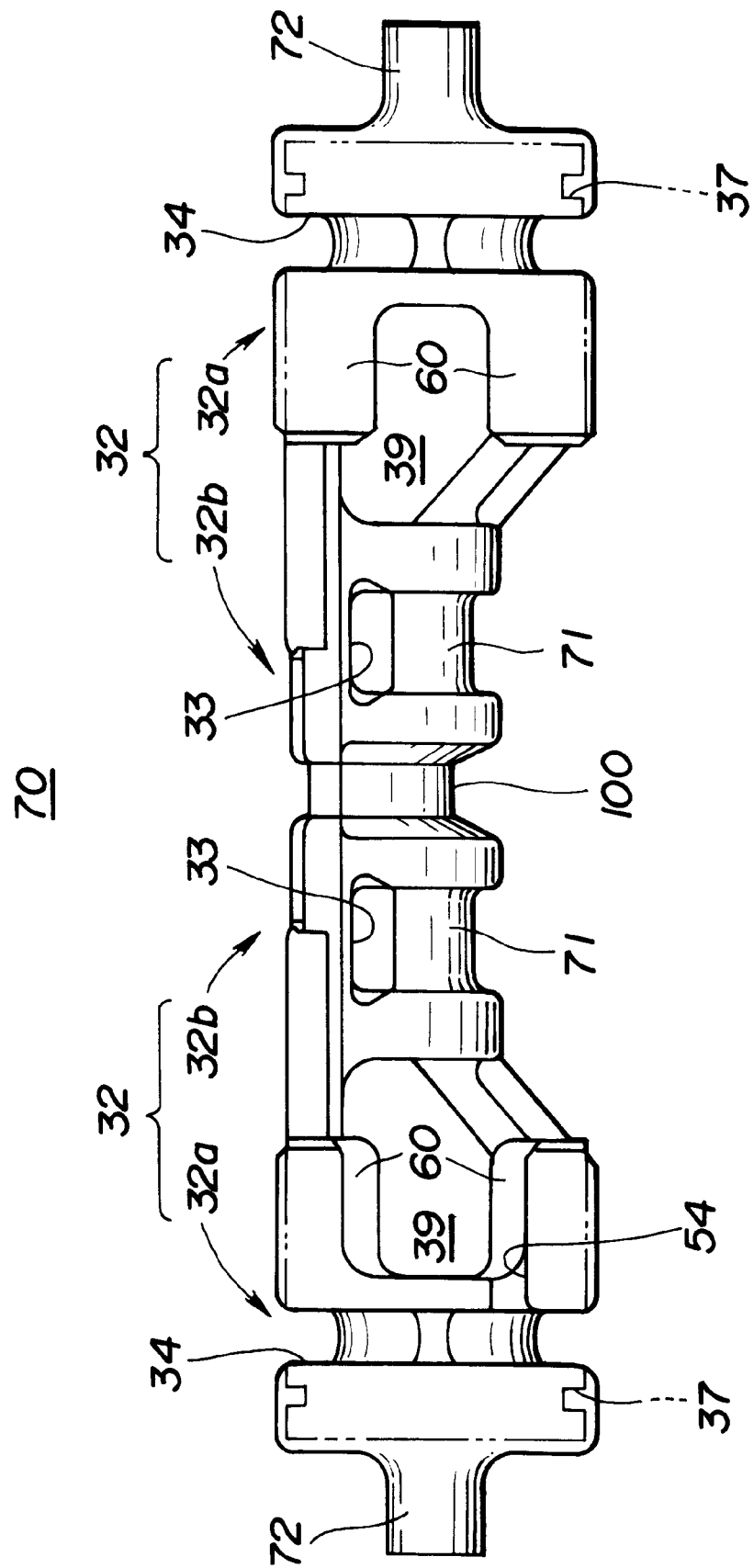

5,960,542

METHOD OF PRODUCING PISTON FOR SWASH PLATE COMPRESSOR

BACKGROUND OF THE INVENTION

1. Field of the Invention

The present invention relates in general to swash plate compressors, and more particularly to a method of producing pistons used in the swash plate compressors.

2. Description of the Prior Art

Swash plate compressors are widely used in an automotive air conditioners for the reason of high efficiency. In the swash plate compressors, there are generally two types, one being a fixed displacement type wherein a swash plate is fixedly mounted on a rotation shaft and the other being a variable displacement type wherein a swash plate is pivotally mounted on a rotation shaft. In both types of compressors, pistons in respective cylinders are reciprocatively driven by a swing motion of the swash plate under rotation of the rotation shaft.

Some of the swash plate compressors of the above-mentioned types are of a so-called "piston direct connection type" wherein each piston is directly but slidably engaged with a peripheral portion of the swash plate without usage of a separate piston rod. In the compressors of such piston direct connection type, single headed pistons are commonly used, which includes each a piston head portion slidably received in a corresponding piston cylinder and a generally U-shaped neck portion slidably engaged with the peripheral portion of the swash plate.

For achieving the slidable connection between the U-shaped neck portion and the peripheral portion of the swash plate, a structure is commonly employed wherein two spherical shoes are slidably put in spherical recesses formed on opposed inner surfaces of the U-shaped neck portion and the peripheral portion of the swash plate is slidably sandwiched between the shoes.

That is, front and rear flat surfaces of the plate's peripheral portion are slidably engaged with flat surfaces of the shoes respectively. Thus, upon rotation of the rotation shaft, the swash plate is forced to make a swing motion around the rotation shaft thereby inducing a reciprocative motion of each piston in the corresponding piston cylinder.

As will be understood from the above, the pistons used in the compressors of the piston direct connection type are important functional parts which need high dimensional accuracy and light weight construction in addition to high productivity.

SUMMARY OF THE INVENTION

It is therefore an object of the present invention to provide a method for producing a single headed piston for swash plate compressors, which satisfies the above-mentioned needs.

According to a first aspect of the present invention, there is provided a method of producing a single headed piston for a swash plate compressor, which comprises the steps of: casting a block of metal, the block including a plurality of unfinished piston structures which are aligned and integrated, each unfinished piston structure including a head portion and a neck portion which are axially spaced; machining the head portions of the piston structures of the cast block; coating an outer surface of the cast block entirely with a fluorocarbon resin; grinding the coated outer surfaces of the head portions of the cast block; machining each neck portion to form two spherical recesses which face each other, the two spherical recesses being used for slidably receiving shoes; and cutting the cast block to separate the piston structures from one another.

According to a second aspect of the present invention, there is provided a method of producing a single headed piston for use in a swash plate compressor which includes a casing having a crank chamber defined therein, a rotation shaft rotatably installed in the casing, a swash plate operatively connected to the rotation shaft to rotate therewith in the crank chamber, a plurality of piston cylinders defined in the casing and arranged at evenly spaced intervals, and a plurality of single headed pistons each including a head portion slidably received in a corresponding one of the piston cylinders and a neck portion slidably engaged with a peripheral portion of the swash plate through two shoes. The method comprises the steps of: casting a shaped block of aluminum alloy, the block including two identical unfinished piston structures which are aligned and integrated, each unfinished piston structure including a head portion and a neck portion which are axially spaced; holding the block and machining the head portions of the piston structures of the cast block; coating an outer surface of the cast block entirely with a fluorocarbon resin; grinding the coated outer surfaces of the head portions of the cast block; machining each of the neck portions to form two spherical recesses which face each other, the spherical recesses being used for slidably receiving therein the shoes; and cutting the cast block to separate the piston structures from one another.

BRIEF DESCRIPTION OF THE DRAWINGS

Other objects and advantages of the present invention will become apparent from the following description when taken in conjunction with the accompanying drawings, in which:

FIG. 6 is a side view of a block of aluminum alloy cast for producing two single headed pistons.

DETAILED DESCRIPTION OF THE INVENTION

Figure 1:
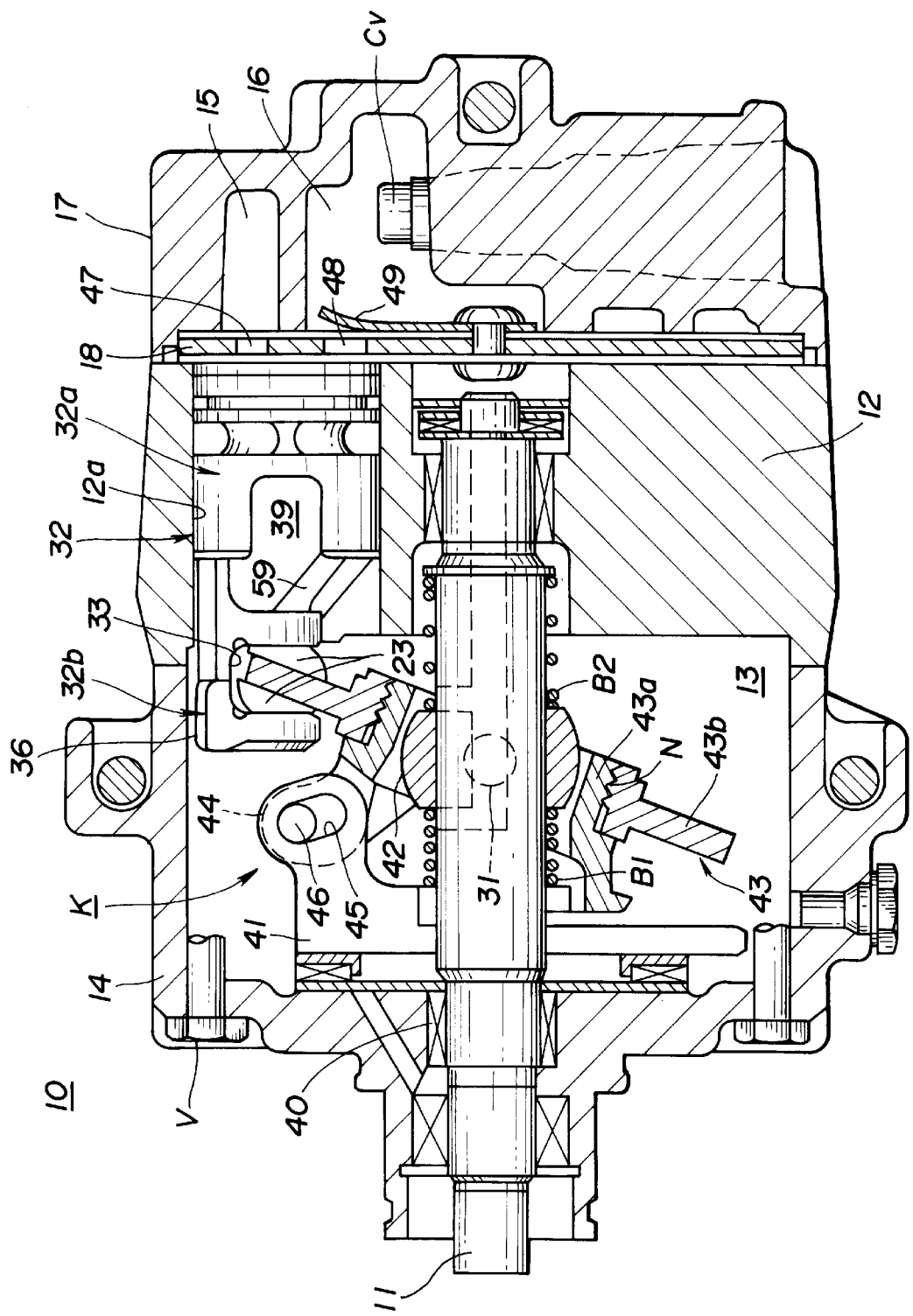
FIG. 1 is a sectional view of a swash plate compressor employing single headed pistons produced by the method of the present invention.

Referring to FIG. 1 of the drawings, there is shown a variable displacement swash plate compressor 10, which practically employs single headed pistons 32 produced by the method according to the present invention.

The swash plate compressor 10 comprises generally a rotation shaft 11, a swash plate 43 rotating together with the rotation shaft 11, a plurality of identical pistons 32, evenly spaced piston cylinders 12a for receiving the pistons 32 and a cylinder block 12 for defining the piston cylinders 12a. Each piston 32 has a generally U-shaped neck portion 32b with a recess 33, and two spherical shoes 23 are slidably received in the recess 33 while slidably putting therebetween a peripheral portion of the swash plate 43. Thus, with a swing motion of the swash plate 43 under rotation of the rotation shaft 11, each piston 32 is forced to make a reciprocating movement in the corresponding piston chamber 12a.

That is, the cylinder block 12 is formed with the piston cylinders 12a, which are arranged at evenly spaced intervals around an axis of the rotation shaft 11. The cylinder block 12 is a die-casting member constructed of a wear-resisting material such as a silicone-contained aluminum alloy. As is known, the cylinder block 12 of this alloy exhibits excellent lubricant holding performance and thus smoothes movement of the pistons 32 in the piston cylinders 12a.

A front housing 14 is fixed to a front side of the cylinder block 12 in a manner to define a crank chamber 13. A rear housing 17 is fixed through a valve sheet 18 to a rear side of the cylinder block 12 in a manner to define an intake chamber 15 and an exhaust chamber 16. The intake chamber 15 receives a return refrigerant from a cooling cycle part (not shown), and the exhaust chamber 16 receives a compressed refrigerant from the piston cylinders 12a. The front housing 14, the cylinder block 12 and the rear housing 17 are united through bolts "V".

The valve sheet 18 has valve forming plates respectively attached to both surfaces thereof. Designated by numeral 49 is a retainer for an exhaust valve, which is exposed to the exhaust chamber 16 and fixed to the valve sheet 18. Designated by numerals 47 and 48 are intake and exhaust openings formed in the valve sheet 18 for each piston cylinder 12a. Although not shown in the drawing, an intake valve provided by one of the valve forming plates is incorporated with the intake opening, and an exhaust valve provided by the other valve forming plate is incorporated with the exhaust opening. That is, a work chamber defined by each piston cylinder 12a is connected to the intake chamber 15 through the intake valve and the intake opening 47, and connected to the exhaust chamber 16 through the exhaust valve and the exhaust opening 49.

Within the crank chamber 13, there is arranged the swash plate 43 pivotally disposed about the rotation shaft 11. More specifically, the swash plate 43 is so connected to the rotation shaft 11 that it rotates together with the rotation shaft 11 while being pivotal about an axis perpendicular to the axis of the rotation shaft 11. As shown, the two spherical shoes 23 received in the U-shaped neck portion 32b of each piston 32 slidably put therebetween the peripheral portion of the swash plate 43.

The swash plate 43 comprises a journal portion 43a of cast iron and an annular flat portion 43b of steel, both united through a thread connection "N".

A front portion of the rotation shaft 11 is rotatably supported by the front housing 14 through a bearing 40. On the rotation shaft 11 near the bearing 40, there is mounted a hinge mechanism "K", which transmits rotation of the rotation shaft 11 to the swash plate 43.

The hinge mechanism "K" comprises an L-shaped stand member 41 which has both a base end fixed to the rotation shaft 11 and a leading end portion formed with an elongate slot 45, a support rink 44, which extends from the journal portion 43a of the swash plate 43 toward the elongate slot 45 of the stand member 41, and a pivot pin 46, which extends from the leading end of the support rink 44 and passes through the elongate slot 45. Accordingly, the swash plate 43 is rotated together with the stand member 41 about the axis of the rotation shaft 11 and at the same time the swash plate 43 is pivotal about an axis of the pivot pin 46.

Axially movably disposed about the rotation shaft 11 is a bush 42 which is biased by two compression springs B1 and B2. As shown, the bush 42 is received in an center bore formed in the journal portion 43a of the swash plate 43. That is, the bush 42 has a rounded outer surface which faces an inner surface of the center bore of the journal portion 43a with a thin space defined therebetween. The journal portion 43a and the bush 42 are pivotally connected through two pins 31 which are aligned. That is, the pins 31 extend radially outward from diametrically opposed sides of the bush 42 and pass through openings formed in diametrically opposed sides of the journal portion 43a. Accordingly, the swash plate 43 rotated together with the rotation shaft 11 is pivotal about a common axis of the two pins 31 carried by the bush 42 which slides along the rotation shaft 11. That is, an inclination angle (viz., an angle relative to an imaginary plane perpendicular to the axis of the rotation shaft 11) of the swash plate 43 can be varied.

For adjusting the inclination angle of the swash plate 43 by controlling the pressure in the crank chamber 13, a pressure control valve "Cv" is mounted in the rear housing 17. That is, in accordance with the pressure of the return refrigerant in the intake chamber 15, the control valve "Cv" controls the pressure in the crank chamber 13 and thus adjusts the inclination angle of the swash plate 43. With this, the amount of refrigerant discharged from the compressor is controlled and the intake pressure of the compressor is kept constant.

As is well shown in FIGS. 2 to 5, each single headed piston 32 comprises a head portion 32a which is slidably received in the piston cylinder 12a and a neck portion 32b which is connected to the peripheral portion of the swash plate 43 through the shoes 23. In order to reduce the weight, the head portion 32a is formed with an annular recess 34.

Figure 3A:
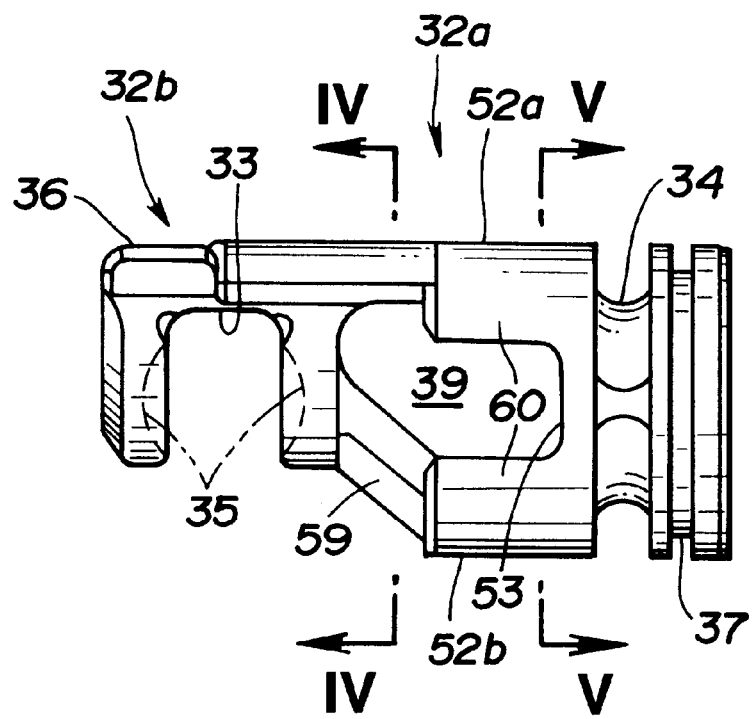
FIG. 3A is a side view of the single headed piston.
Figure 3B:
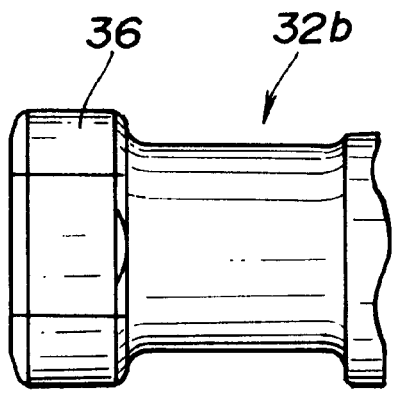
FIG. 3B is a partial plan view of the single headed piston.
Figure 4:
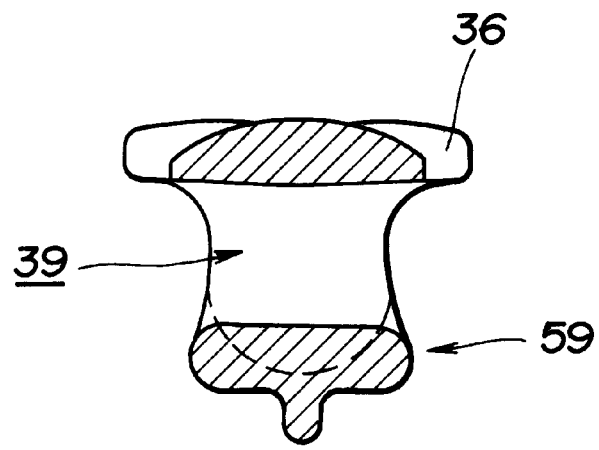
FIG. 4 is a sectional view taken along the line IV—IV of FIG. 3A.

As is best seen from FIG. 3A, the neck portion 32b is formed with a recess 33 which faces downward in the drawing. With provision of this recess 33, the neck portion 32b has a generally U-shape. Axially opposed wall portions of the recess 33 are formed with spherical recesses 35 for slidably supporting the two spherical shoes 23. As is seen from FIG. 1, the two shoes 23 slidably put therebetween the peripheral portion of the swash plate 43. More specifically, flat surfaces of the shoes 23 slidably contact to opposed flat surfaces of the peripheral portion of the swash plate 43.

When each piston 32 is reciprocating in the corresponding piston cylinder 12a, the peripheral portion of the swash plate 43 is forced to run at a high speed between the two shoes 23 while receiving a reaction force from the piston 32 under compression stroke. Thus, during operation of the compressor 10, there is inevitably produced a force to bias the piston 32 to rotate about its axis. In order to suppress this undesired rotation of the piston 32, a rotation stopper 36 is formed on the neck portion 32b, which abuts against an inner wall of the crank chamber 13 when the rotation is about to occur. As is seen from FIG. 2, the rotation stopper 36 is an arcuate block which has opposed ends projected radially outward.

The head portion 32a is formed with an annular groove 37 for receiving therein a piston ring (not shown).

As is seen from FIGS. 2, 3A, 4 and 5, the piston 32 is formed at a generally middle portion thereof with a through bore 39 which extends in a direction along which the peripheral portion of the swash plate 43 runs.

Figure 5:
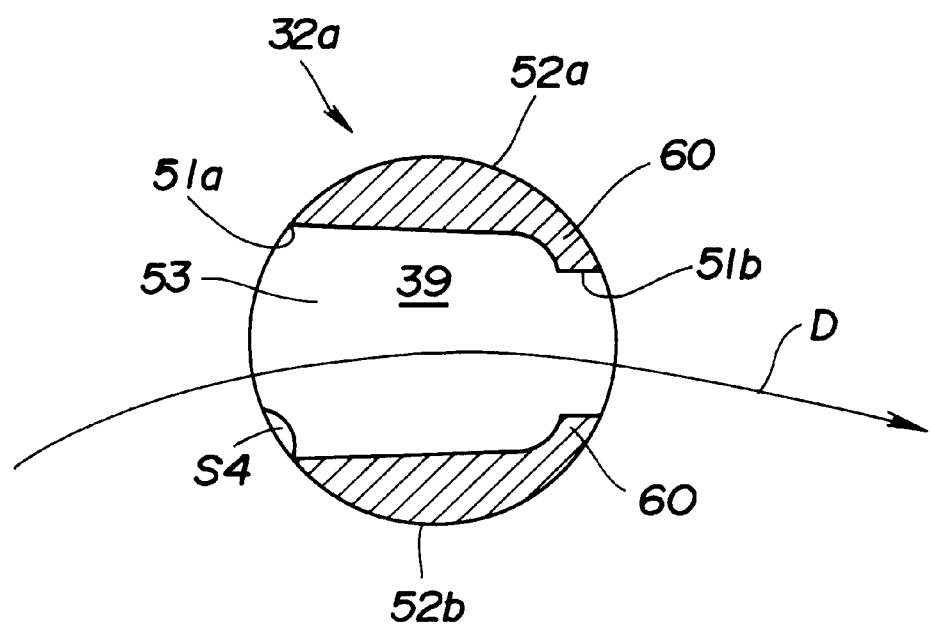
FIG. 5 is a sectional view taken along the line V—V of FIG. 3A.

As will be understood from FIG. 5, the through bore 39 is formed with leading and trailing ends 51a and 51b with respect to the direction "D" in which the swash plate 43 rotates. Due to provision of the through bore 39, first and second semi-cylindrical surfaces 52a and 52b are provided on the head portion 32a, which slidably contact diametrically opposed portions of the inner wall of the piston cylinder 12a.

As is seen from FIG. 5, the trailing end 51b of the through bore 39 is reduced in size by inward projections 60. It is now to be noted that, due to provision of the inward projections 60, a cylindrical surface area of the head portion 32a which is strongly pressed against the wall of the piston cylinder 12a due to a circumferential biasing force produced under rotation of the swash plate 43 in the direction of "D" is increased. That is, in FIG. 5, the right half of the head portion 32a has a cylindrical surface area larger than that of the left half of the same. Thus, a smoothed reciprocating movement of the piston 32 is achieved irrespective of the circumferential biasing force applied thereto.

As is seen from FIG. 1, a front portion of the through bore 39 is exposed to the crank chamber 13. Accordingly, under rotation of the swash plate 43, atomized lubricant in the refrigerant is led onto the swash plate 43, and impinged against the shoes 23 to splash, and led into the through bore 39 from the front portion of the bore 39. The lubricant is then led to the inner wall of the piston cylinder 12a through the leading end trailing ends of the through bore 39. Thus, the inner wall of the piston cylinder 12a is kept wet with the lubricant thereby smoothing the reciprocating movement of the head portion 32a of the piston 32 in the piston cylinder 12a.

Figure 2:
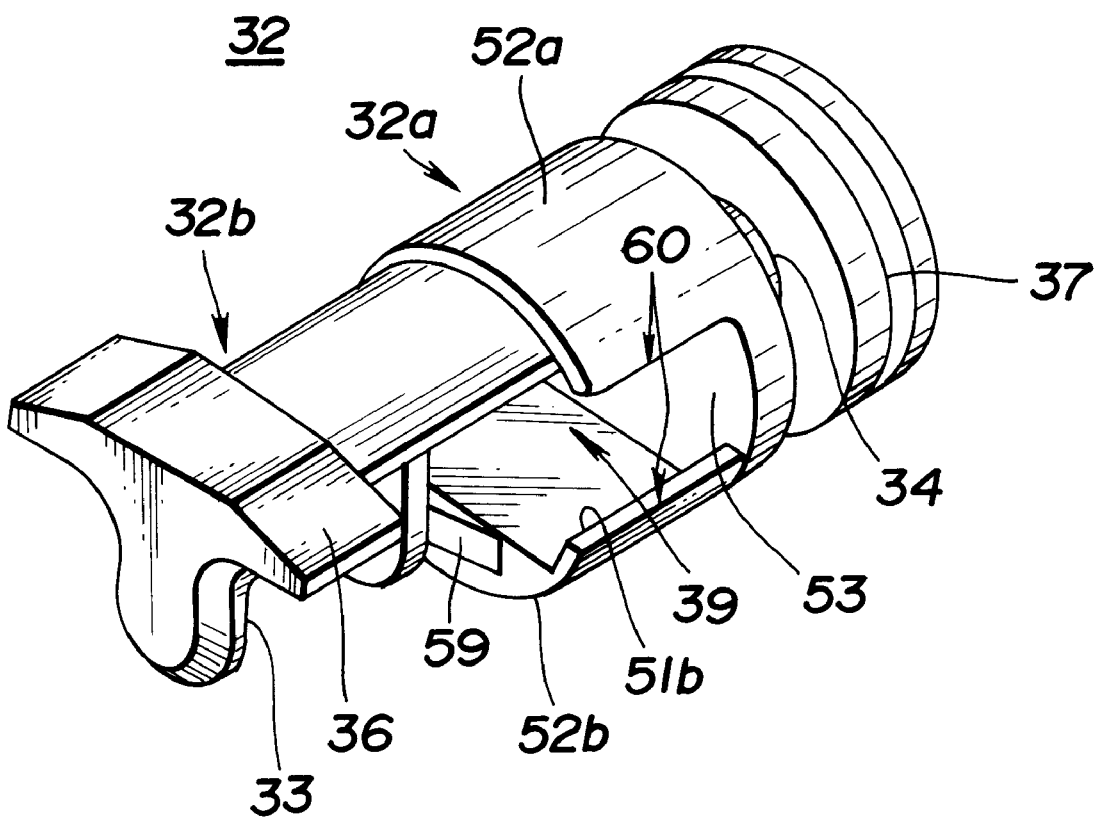
FIG. 2 is a perspective view of a single headed piston produced by the method of the present invention.

As is seen from FIG. 2, the through bore 39 has a circular rear wall 53 which faces toward the peripheral portion of the swash plate 43. As is seen from FIG. 5, the circular rear wall 53 has near the leading end of the through bore 39 a cut 54 through which the lubricant is led to the annular recess 34 (see FIG. 3A) formed around the head portion 32a.

As is seen from FIG. 3A, between a rear part of the neck portion 32b and a front lower part of the head portion 32a, there extends a rib 59. With this rib 59, mechanical connection between the head portion 32a and the neck portion 32b is increased. That is, a marked stress applied to the neck portion 32b from the swash plate 43 is transmitted to the head portion 32a through two force transmitting structures, one being a structure including the first semi-cylindrical surface 52a and the other being a structure including the second semi-cylindrical surface 52b. Another marked stress applied to the head portion 32a during its reciprocating movement in the piston cylinder 12a is transmitted to the neck portion 32b through the two force transmitting structures.

In the following, a method of producing the above-mentioned single headed piston 32 will be described.

First, as is seen from FIG. 6, a cast block 70 of aluminum alloy is prepared, which includes two identical unfinished piston structures 32 which are aligned having their neck portions 32b integrated through a bridge 100. To increase durability and strength of the piston 32 produced, various elements are added to the aluminum alloy. As is seen from FIG. 6, in the cast block 70, the two unfinished piston structures 32 are arranged to establish a point symmetry therebetween with respect to a center of the bridge 100. The head portions 32b of the two unfinished piston structures 32 are coaxially arranged. The through bore 39 of each unfinished piston structure is produced by using dividable dies. Each unfinished piston structure 32 has both a bridge portion 71 which extends between the axially opposed wall portions of the recess 33 and a grip portion 72 which projects axially outward from a bottom of the head portion 32a. As will be described hereinafter, the bridge portion 71 and the grip portion 72 are removed to finish the piston 32. That is, until the finishing work, the bridge portion 71 is left for providing the unfinished piston structure 32 with a certain mechanical strength which can overcome a stress produced when the two unfinished piston structures 32 are separated by cutting the bridge 100.

Then, the cast block 70 is tightly held having the grip portions 72 gripped by holders. Then, by using a lathe, outer surfaces of the two head portions 32a and the two annular grooves 37 are machined. Then, the grip portions 72 are cut. That is, a portion illustrated on an outer side of a phantom line in FIG. 6 is removed in this second step.

Then, by using a splaying technique, an outer surface of the cast block 70 machined as above is coated entirely with a fluorocarbon resin (viz., poly-4-fluoroethylene) or the like. With this coating, sliding of the piston 32 in the piston cylinder 12a is smoothly made.

Then, the coated outer surfaces of the head portions 32a are ground. Due to the elongated structure of the cast block 70 which assures a satisfied axial span between the two head portions 32a, a centerless grinder can be used, which brings about a precise, speedy and effective grinding on the head portions 32a. It is now to be noted that the centerless grinder used in this case has a run off for the rotation stopper 36 of each piston 32. Accordingly, ingress and egress of the cast block 70 relative to the grinder should be made in a direction perpendicular to a rotation axis of the grinder.

Once the grinding of the two head portions 32a is finished, the bridge portions 71 are removed. Then, a precise machining is applied to axially opposed wall portions of each recess 33 to form the spherical recesses 35. Thus, until this step, machining for each piston 32 is substantially finished.

Finally, the two pistons 32 are separated by cutting the bridge 100 and then an end surface machining is applied to each piston 32 to finish the same.

In the following, advantages of the method according to the present invention will be described.

First, due to the twin structure possessed by the cast block 70, productivity of the piston 32 is increased. That is, machining, resin coating and grinding for the integrated two pistons 32 are easily and quickly carried out.

Second, due to the elongate structure possessed by the cast block 70, a centerless grinder can be used, which brings about a precise, speedy and effective grinding on the pistons 32.

If desired, the cast block 70 may be so constructed as to include three or more identical unfinished piston structures which are aligned. Furthermore, the arrangement of the two unfinished piston structures 32 may be so made that their head portions 32a are integrated through a bridge 100. Furthermore, the two unfinished piston structures 32 may be oriented in the same direction on the cast block 70.

It is to be noted that the piston 32 produced by the method of the present invention is practically applicable not only to a variable displacement swash plate compressor 10 but also to a fixed displacement swash plate compressor.

The invention has been described in connection with the preferred embodiments. These embodiments, however, are merely for example only and the invention is not restricted thereto. It will be understood by those skilled in the art that other variations and modifications can easily be made within the scope of the invention as defined by the claims.

What is claimed is:

1. A method of producing a plurality of single headed pistons for a swash plate compressor, comprising the steps of:

(a) casting a block of metal, said block including a plurality of unfinished piston structures which are aligned and integrated, each unfinished piston structure including a head portion and a neck portion that are axially spaced;

(b) machining the head portions of the piston structures of the cast block;

(c) coating an outer surface of the cast block entirely with a fluorocarbon resin;

(d) grinding the coated outer surfaces of the head portions of the cast block;

(e) machining each neck portion to form two spherical recesses which face each other, said two spherical recesses being used for slidably receiving shoes; and (f) cutting the cast block to separate the piston structures from one another to form a plurality of single headed pistons.

2. A method as claimed in claim 1, in which the number of the unfinished piston structures of the cast block is two, in which the two unfinished piston structures are identical in shape, and in which the two unfinished piston structures are aligned having their neck portions integrated through a bridge.

3. A method as claimed in claim 2, in which the two unfinished piston structures of the cast block are arranged to establish a point symmetry therebetween with respect to a center of said bridge.

4. A method as claimed in claim 3, in which each unfinished piston structure has both a bridge portion which extends between the head portion and the neck portion and a grip portion which projects axially from a bottom of the head portion.

5. A method as claimed in claim 4, in which the grip portion of each unfinished piston structure is held by a holder during the step (b) and cut out upon completion of the step (b).

6. A method as claimed in claim 5, in which the bridge portion of each unfinished piston structure is cut out at a time between the step (d) and the step (e).

7. A method as claimed in claim 1, in which the metal of the cast block is aluminum alloy.

8. A method as claimed in claim 1, in which said step (b) includes a step of machining an annular groove around the head portion, said annular groove being used for receiving therein a piston ring.

9. A method as claimed in claim 1, in which the number of the unfinished piston structures of the cast block is two, in which the two unfinished piston structures are identical in shape, in which the two unfinished piston structures are aligned having their head portions integrated through a bridge.

10. A method of producing a plurality of single headed pistons for a swash plate compressor, comprising:

providing a block of metal having a plurality of unfinished, aligned, and integrated piston structures, each unfinished piston structure including a head portion and neck portion axially spaced from the head portion;

coating an entire outer surface of the block with a fluorocarbon resin;

grinding the coated outer surfaces of the head portions of the block to provide the head portions with finely polished fluorocarbon resin surfaces;

machining each neck portion to form two spherical recesses facing each other, the two spherical recesses being used for slidably receiving shoes; and cutting the block to separate the piston structures from one another to form a plurality of single headed pistons.

11. A method of producing a plurality of single headed pistons for a swash plate compressor, comprising:

providing a block of metal having a plurality of unfinished, aligned, and integrated piston structures, each unfinished piston structure including a neck portion;

coating an entire outer surface of the block with a fluorocarbon resin;

machining each neck portion to form two spherical recesses facing each other, the two spherical recesses being used for slidably receiving shoes; and cutting the block to separate the piston structures from one another to form a plurality of single headed pistons.

12. A method according to claim 11, wherein the number of the unfinished piston structures is two, and the two unfinished piston structures are identical in shape and are aligned, with the neck portions integrated through a bridge.

13. A method according to claim 12, wherein the two unfinished piston structures are arranged to establish a point symmetry therebetween with respect to a center of the bridge.

14. A method according to claim 13, wherein each unfinished piston structure also includes a head portion, a bridge portion extending between the head portion and the neck portion, and a grip portion projecting axially from the head portion.

15. A method according to claim 14, wherein the grip portion of each unfinished piston structure is adapted to be held with a holder.

16. A method according to claim 11, wherein the block metal is an aluminum alloy.

17. A method according to claim 11, further including machining an annular groove for receiving a piston ring around the head portion while the unfinished piston structure is held between the holders and before the block metal is cut.

* * * * *